United States Patent
Dieckmann et al.

(10) Patent No.: US 9,845,118 B2
(45) Date of Patent: Dec. 19, 2017

(54) REAR SPOILER DEVICE FOR A VEHICLE

(71) Applicant: WABCO Europe BVBA, Brussels (BE)

(72) Inventors: Thomas Dieckmann, Pattensen (DE); Gandert Marcel Rita Van Raemdonck, Delft (NL); Frank Zielke, Barsinghausen (DE)

(73) Assignee: WABCO Europe BVBA, Brussels (BE)

( * ) Notice: Subject to any disclaimer, the term of this patent is extended or adjusted under 35 U.S.C. 154(b) by 0 days.

(21) Appl. No.: 15/100,770

(22) PCT Filed: Nov. 28, 2014

(86) PCT No.: PCT/EP2014/003193
§ 371 (c)(1),
(2) Date: Jun. 1, 2016

(87) PCT Pub. No.: WO2015/086120
PCT Pub. Date: Jun. 18, 2015

(65) Prior Publication Data
US 2016/0304138 A1    Oct. 20, 2016

(30) Foreign Application Priority Data
Dec. 11, 2013 (DE) .................. 10 2013 020 886

(51) Int. Cl.
*B62D 35/00* (2006.01)

(52) U.S. Cl.
CPC .......... *B62D 35/001* (2013.01); *B62D 35/007* (2013.01)

(58) Field of Classification Search
CPC .. B62D 35/001; B62D 35/007; B62D 35/008; B62D 37/02
(Continued)

(56) References Cited

U.S. PATENT DOCUMENTS

| 4,818,015 A * | 4/1989 | Scanlon | B62D 35/001 |
| | | | 296/180.1 |
| 8,235,456 B2 * | 8/2012 | Nusbaum | B62D 35/001 |
| | | | 296/180.1 |

(Continued)

FOREIGN PATENT DOCUMENTS

| DE | 10228658 A1 | 1/2004 |
| DE | 202009015009 U1 | 1/2010 |

(Continued)

OTHER PUBLICATIONS

European Patent Office, Rijswijk, Netherlands, International Search Report of International Application No. PCT/EP2014/003193, dated Mar. 4, 2015, 2 pages.

*Primary Examiner* — Dennis H Pedder
(74) *Attorney, Agent, or Firm* — Brinks Gilson & Lione

(57) ABSTRACT

A rear spoiler device for a vehicle at least includes an air-guiding element (25) for lengthening the contour, in particular of a side surface (3) of the vehicle (1), in a travel position, and a displacement device for displacing the air-guiding element (25) between the travel position and a home position. A front end (54) of the air-guiding element (25) is provided for bearing against the side surface (3) of the vehicle (1) in the travel position. At least one sealing element (61) for sealingly bearing against the side surface (3) is provided on the front end (54) of the air-guiding element (25), and the displacement device is provided for pressing the sealing element (61) against the side surface (3) in the travel position.

19 Claims, 6 Drawing Sheets

(58) Field of Classification Search
USPC .............................. 296/180.1, 180.4, 180.5
See application file for complete search history.

(56) References Cited

U.S. PATENT DOCUMENTS

| | | |
|---|---|---|
| 8,333,424 B2 | 12/2012 | Molnar et al. |
| 8,905,461 B2* | 12/2014 | Laudet ................. B62D 35/001 180/903 |
| 8,973,972 B2 | 3/2015 | Dieckmann et al. |
| 2013/0076064 A1 | 3/2013 | Smith et al. |
| 2013/0106136 A1 | 5/2013 | Smith et al. |
| 2015/0008701 A1* | 1/2015 | Ryan .................... B62D 35/001 296/180.1 |
| 2015/0217814 A1* | 8/2015 | Wiegel ................. B62D 35/001 296/180.4 |

FOREIGN PATENT DOCUMENTS

| | | |
|---|---|---|
| DE | 202009014476 U1 | 2/2010 |
| DE | 202009014510 U1 | 2/2010 |
| DE | 102009014860 A1 | 10/2010 |
| WO | 2011/153185 A2 | 12/2011 |
| WO | 2012/051134 A2 | 4/2012 |

* cited by examiner

REAR SPOILER DEVICE FOR A VEHICLE

TECHNICAL FIELD

The invention relates to a rear spoiler device for a vehicle, in particular a commercial vehicle, e.g., a truck, wherein the vehicle comprises at least one rear door, in particular two rear doors. The rear spoiler device is suitable in particular for a vehicle having a substantially box-type structure or side walls, a roof, and rear doors adjoining said roof at a right angle toward the rear.

BACKGROUND OF THE INVENTION

WO 2012/051134 A1 and WO 2011/153185 A1 describe rear spoiler systems in which, inter alia, air-guiding surfaces extending along a portion of the vertical height of the box-type structure are attached on the side walls; in addition, corresponding air-guiding surfaces are attached on the roof. The air-guiding surfaces reach over the blunt end of the box-type structure. The outer surface of the air-guiding surfaces extends from the front edge of each air-guiding surface toward the rear, initially transversely toward the outside or vertically upward, whereby the overall cross-section of the vehicle is increased, and extends slightly inwardly behind the rear surface of the vehicle. The air-guiding surfaces fixedly rest against the flat side surfaces or the flat top surface of the box-type structure.

US 2013/0106136 A1 describes a rear spoiler system, which is attached on the roof surface, rests at its front end on the roof surface and subsequently extends upward with a curvature in order to cover a rear edge of the rear-door frame. The air-guiding element rests on this edge. US 2013/0076064 A1 also shows such a system in which air-guiding surfaces are attached on the roof surface and on the side surfaces, wherein the air-guiding surfaces are displaceable, in particular retractable and extendable.

Therefore, in general, the air-guiding surfaces rest against the side surfaces or the roof surface of the box-type structure, some of which additionally rest against the rear edge, in order to be supported there.

DE 10 2009 014 860 A1 shows a rear spoiler device comprising a displacement device. It comprises air-guiding elements for lengthening the contour and for the aerodynamic air guidance of the side walls and the roof, which elements, in a home position, are folded in toward the rear doors and, in the travel position or the operative position, are raised up or extended and are supported on fastening elements of a rear vehicle edge. Such rear spoilers are used for improving the aerodynamics of the vehicle and can therefore reduce fuel consumption.

DE 20 2009 014 476 U1, DE 20 2009 014 510 U1 and DE 20 2009 015 009 U1 show further rear spoiler devices in which the air-guiding elements or spoiler elements are disposed so as to be displaceable or swivelable in order to allow for unobstructed opening of the rear doors.

Rear spoilers that are connected to hinges of the rear doors are also known. DE 102 28 658 A1 shows different flap solutions in which flat surfaces, which are swivelable by means of a hinge, are intended to provide for an aerodynamic optimization in the driving mode.

Such connections of the air-guiding elements in the hinge region are generally complex, however, and are limited to special hinge designs. In addition, the length of the usable air-guiding elements is generally limited. When the rear doors are swiveled open by 270° toward the front, relatively complex rear spoiler designs, in particular when used in the hinge region, can often adversely affect the swivel-open process.

In addition, the handling for the displacement from the home position into the travel position and also for the return thereto is generally labor-intensive. In addition, complex locking mechanisms are often provided in order to ensure sufficient stability of the different air flows and air vortices. These systems often have a quite complex design, on the one hand, and, on the other hand, are complicated to adjust. In addition, the functionality of the vehicle, in particular its accessibility as well, is somewhat limited.

SUMMARY OF THE INVENTION

The problem addressed by the invention is that of creating a rear spoiler device that provides for a reduction of the aerodynamic drag of the vehicle with relatively little outlay.

According to the invention, the rear spoiler device therefore comprises at least one air-guiding element, which is displaceable between a home position and a travel position and, in the travel position, rests against an outer surface of the vehicle, in particular a side surface or the roof surface of a box-type structure. In this case, at least one sealing element for sealingly bearing against the side surface is provided at the front end region of the air-guiding element. The sealing element can be designed in particular as a sealing lip, i.e., having a smaller width than the air-guiding element on the side. The sealing element can be provided as a separate component, in particular rubber or a plastic, or can be integrated at the front end region. In an integrated design, said sealing element can be flexible, e.g., due to a thin-walled design, and can therefore sealingly bear against surfaces.

In the travel position, the sealing element is pressed against the outer surface; this can take place, in particular, by means of a displacement device, which displaces—in particular, swivels—the air-guiding element against the outer surface. In this case, a four-link mechanism or a swivel mechanism, in particular, can be provided for swiveling the air-guiding element from a rear home position, toward the front, onto the outer surface for forming the travel position.

The invention is based on the finding that, in a design having a blunt end, in particular in the case of a box-type structure of a commercial vehicle, high aerodynamic drag can occur, in particular due to irregularities in the rear region of the outer surface, i.e., in the rear region of the side surfaces or even a roof surface. These irregularities can be initially caused by the rear frame of the support frame, which generally also supports the rear doors.

The irregularities can also be induced by functional structures on the side, which are provided for flexible or displaceable side walls. Some trucks comprise extendible side surfaces having flexible panels or Venetian blind-type lamellae. For this purpose, truck structures having side panels or flexible side coverings often comprise, at the rear end region, structures for accommodating and/or for tensioning the side panels, e.g., a roller or an accommodating box having a roller and a tension spring.

The irregularities in the side surface result in turbulence during travel. It has been surprisingly shown that the aerodynamic drag of the vehicles is determined, to a considerable extent, by such irregularities. According to the invention, it was surprisingly determined that air-guiding elements, which cover these irregularities and bring about a sealing effect using sealing element, result in substantial improvements.

Given that the sealing element seal an intermediate space between themselves and the rear region of the outer surface of the structure with respect to the outer space, either no air exchange or only a slight amount of air exchange with the outer space takes place during travel. During the vehicle travel, the air flow can induce a substantial negative pressure outside of the air-guiding surfaces; the intermediate space between the air-guiding surface and the outer surface of the vehicle can be separated by the sealing element to such an extent, however, that air does not escape here, or does not escape to a relevant extent, whereby the formation of turbulence can be substantially reduced.

It has been shown, in particular, that vertical flows or portions of air vortices extending in the vertical direction are substantially reduced by the air-guiding elements. It has been shown that a substantial reduction of the overall aerodynamic drag can be achieved by largely eliminating such vertical flow elements.

Although the overall cross-section is therefore increased due to the air-guiding elements, a substantial reduction of the overall aerodynamic drag can be achieved.

The air-guiding elements therefore advantageously have a three-fold functionality:

- they lengthen the outer surface, in particular the side surface, beyond the blunt end, in particular by extending toward the rear and inward, e.g., in a straight line or curved, in order to reduce the outline turbulence;
- they cover the irregularities;
- they seal an intermediate space between themselves and the rear region of the outer surface of the structure with respect to the outer space.

A good seal can be achieved by means of a press-on process in which the front end region or the front edges of the air-guiding elements, with their sealing element, are compressed or pressed, from the outside toward the inside, in the transverse direction, against the outer surface. For this purpose, a displacement system is advantageous, in particular, which ensures such a displacement from the home position into the travel position, in particular even as forced guidance having defined displacement kinematics. Simply by means of this press effect, it is therefore possible to achieve a better seal than is the case, e.g., using screwed-on air-guiding elements.

The displacement of the air-guiding elements can be carried out, in particular, by means of a four-link mechanism having two rocker arms of different lengths, which arms are spaced apart from one another, in particular as forced guidance from the home position into the travel position. A defined guidance of the air-guiding elements between its positions that is comfortable for the user is therefore made possible, e.g., without one degree of freedom of a rotation occurring in addition to a swivel motion. The displacement is also easy for the operator to carry out; said displacement can be carried out with one hand, for example.

According to a preferred embodiment, the entire rear spoiler device can be attached only to the rear doors of the vehicle. In particular, the entire rear spoiler device, in the retracted, home position, cannot protrude outward or can remain within the cross-sectional area of the doors and therefore does not protrude and thereby cause interference.

Given that the rear spoiler device in its entirety is fastened on the rear door, said rear spoiler device can also be swiveled forward when the rear door is opened, without interfering with the process of opening the rear door; it is therefore possible to achieve an opening angle, e.g., of 270° or substantially 270°, and so the rear doors can be swiveled substantially entirely open and can rest against the side surface of the vehicle.

Advantageously, the four-joint coupling has exactly four joints, i.e., four joint axes. As a result, a forced guidance of the air-guiding element between its home position and its travel position is made possible, i.e., a defined guidance without an additional degree of freedom. The four joints or joint axes of the four-link coupling can also each be formed by multiple joints disposed in the same joint axis, e.g., by two joints disposed in one joint axis or two rocker arms, each of which has, e.g., two or more joints, all of which are disposed in the same joint axis, however.

The kinematics of the four-joint coupling allows for a swivel-open process in which the particular air-guiding element is initially swiveled slightly backward away from the rear doors and then, with its front end, is swiveled forward in a curved motion and, in a final phase, is swiveled from the outside toward the inside in the transverse direction. These kinematics of the four-joint coupling has substantial advantages over a simple swiveling process about a single fulcrum.

In this case, the four-joint coupling comprises, in particular, at least one main rocker arm having a longer length and at least one secondary rocker arm having a shorter length.

The forced guidance can be supported by a spring effect. The spring load of the particular air-guiding element can be designed, in particular, so as to be bistable. Proceeding from the home position, the user therefore initially presses the air-guiding element, in a first swivel range, against the spring effect up to an intermediate dead-center position, proceeding from which, in a second swivel range, an automatic or at least spring-supported swivel-open process into the travel position takes place, and, in the reverse order, from the travel position back into the home position. As a result, errors in the displacement can be avoided and the handling can be simplified.

A rear spoiler device comprising one or two lateral spoiler devices and one or two roof-spoiler devices can therefore be successively displaced, e.g., by first deploying the lateral spoiler devices and subsequently displacing the roof-spoiler devices, e.g., using an actuating means such as an actuating rod.

The locking of the lateral guiding surfaces can be carried out, e.g., using brackets that can be folded over, e.g., on the secondary rocker arms, in particular both in the travel position and in the home position.

In the folded-in home position, the lateral air-guiding element, for example, can be laid onto the folded-down roof air-guiding element, thereby providing for a flat and space-saving accommodation on the rear doors.

The entire rear spoiler device can be mounted only on the at least one rear door, i.e., without additional connections to a vehicle frame or to a vehicle structure. Advantageously, the entire rear spoiler device can be mounted only on an outer surface of the rear doors. In the case of a vehicle comprising two outwardly swivelable rear doors, it is therefore possible to mount a rear spoiler device, which has left and right lateral and roof spoiler devices, on the two rear doors, e.g., only on their outer surfaces, i.e., without the need for an upper edge of the rear doors, for example, which is not possible with refrigerated semitrailers, for example.

A type-independent arrangement is therefore provided. Preferably, in the home position, both the lateral air-guiding element and the roof air-guiding element are swiveled out of the door-hinge region, and so a maximum opening angle of the rear doors is ensured and the at least one rear door is not prevented from being swiveled open toward the front by approximately 270°. The rear door can therefore be swiveled entirely forward, from its closed position, by approximately 270°, wherein the folded-in rear spoiler device rests in a flat position against the rear door or both rear doors and can therefore be accommodated between the rear doors and the side wall. This swivel-open process is therefore supported, according to the invention, by the fact that there is no need for labor-intensive, complex connections in the hinge region, which interfere with such a swivel-open process of the rear doors and impede large opening angles.

The attachment to the rear doors can be carried out only from the outside or from behind, without the need to install additional elements, e.g., in upper edges of the rear doors.

Given that it is only the rear doors to which the attachment is carried out, retrofitting is also possible; the rear spoiler device can also be attached on refrigerated semitrailers and other commercial vehicles, for example. In both the home position and the travel position, it is possible to drive through automatic vehicle washing facilities the rear spoiler device becoming damaged.

In the folded-in home state, the rocker arms advantageously rest directly on the rear doors and the particular air-guiding element rest on the rocker arms at least in some areas. Preferably, the lateral air-guiding element rests on the roof air-guiding element.

The invention is explained in greater detail in the following on the basis of the attached drawings of a few embodiments.

DETAILED DESCRIPTION OF THE DRAWINGS

FIGS. 1 to 9 initially generally show a vehicle 1, in particular a commercial vehicle 1 or truck, having the kinematic displacement mechanism and different displacements. FIG. 10 then shows, in greater detail, the cover and sealing according to one preferred embodiment.

Figure 1:
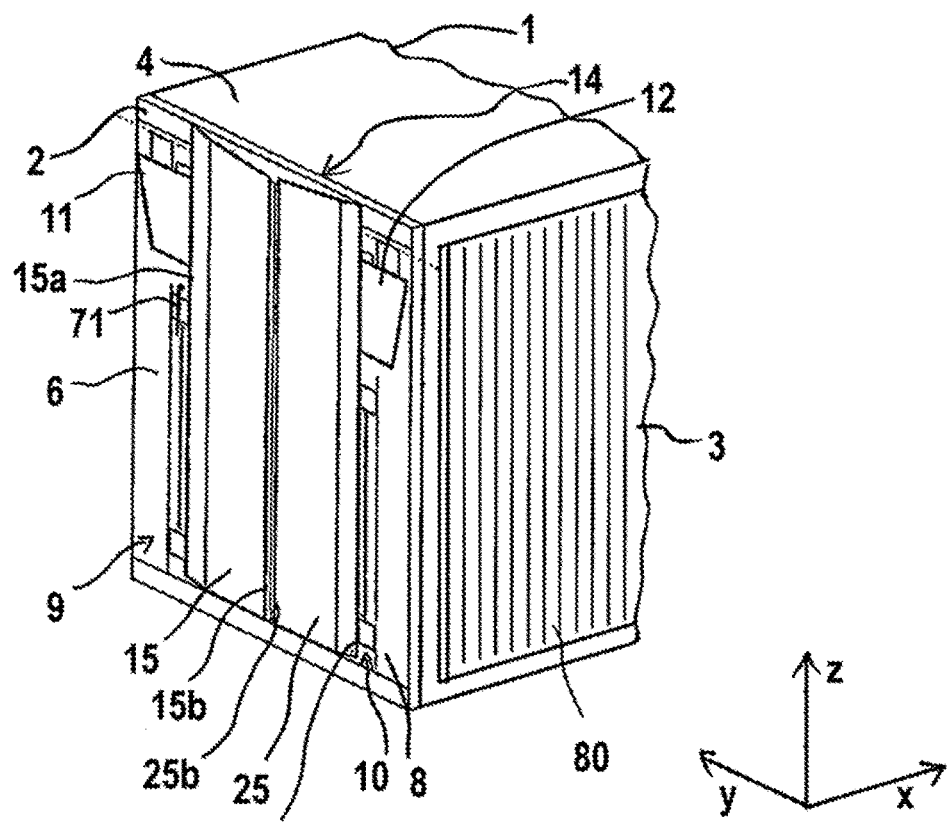
FIG. 1 shows a rear region of a vehicle comprising a rear spoiler device according to one embodiment of the invention, in the home position.

FIG. 1 shows a rear region of a vehicle 1, in particular a commercial vehicle 1 or truck, comprising a vehicle structure 2, which in this case in particular is a vehicle frame or a rear vehicle portal, side walls 3, a roof 4, and a left (in the driving direction) vehicle door 6 and a right vehicle door 8.

On the side walls 3—or at least one side wall 3—a tarp is designed as a side panel 80, which forms the entire side wall or a substantial portion thereof. The side panel 80 is indicated in FIG. 1 by vertical lines; instead of being formed of a flexible material, it can also be formed, e.g., by vertical slats or can be designed in the manner of a Venetian blind. The side panel 80, when retracted, is accommodated in a receptacle 81 provided in a rear end region.

Figure 5:
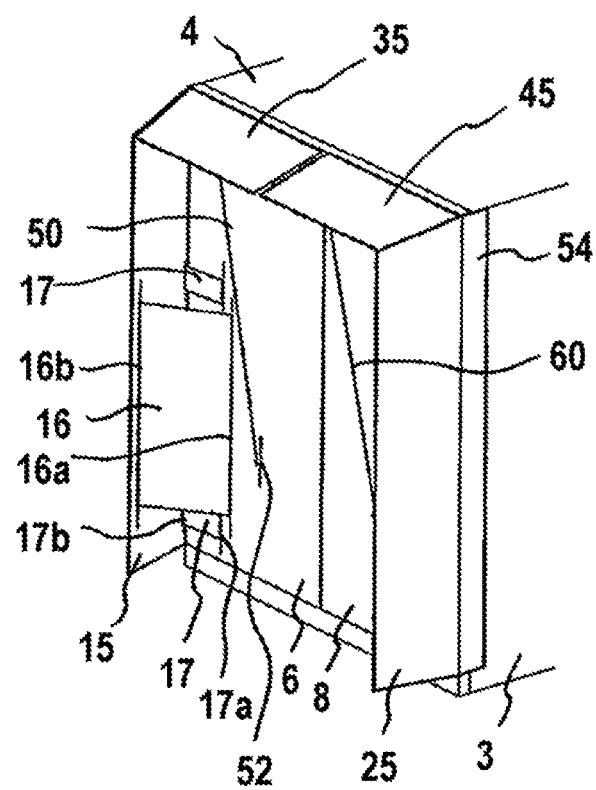
FIG. 5 shows the rear region of the vehicle in the travel position.

Fastened on the left rear door 6 is a left lateral spoiler device 9 and a left roof spoiler device 11, each of which is displaceable between a folded-in, home position and a folded-out or extended travel position; correspondingly, a right lateral spoiler device 10 and a right roof spoiler device 12 are attached on the right rear door 8 and are displaceable between a folded-in, home position and a folded-out or extended travel position. The two lateral spoiler devices 9, 10 and the two roof spoiler devices 11, 12 in combination form a rear spoiler device 14, which is therefore displaceable between a home position shown in FIG. 1 and a travel position for lengthening the contour, which travel position is shown in FIG. 5 and is shown in greater detail in FIG. 10.

The left lateral spoiler device 9 comprises a left lateral air-guiding element 15, a main rocker arm 16, and at least one secondary rocker arm 17, each of which is hingedly mounted between the left rear door 6 and the lateral air-guiding element 15. A four-joint coupling 18 is formed as a result.

The right lateral spoiler device 10 is designed so as to correspond to the left lateral spoiler device 9, i.e., so as to be symmetrical thereto or a mirror image thereof in the drawings, and comprises a right lateral air-guiding element 25, a right main rocker arm 26, and two secondary rocker arms 27 disposed one above the other. A four-joint coupling 28 is therefore formed.

The lateral spoiler devices 9 and 10 are displaceable between the home position and the travel position by means of the four-joint couplings 18, 28. The travel position is shown in FIGS. 4, 5, 8 and 10 for the right lateral spoiler device 10 having the right lateral air-guiding element 25.

The lateral air-guiding elements 15 and 25 are preferably formed with a slight inward curvature, as is evident from FIG. 10 in particular. They each have a front end region 54, on which a sealing element (a sealing lip) 61 is attached or formed, which sealing element, in the travel position, is pressed against the side wall 3 or 4, i.e., for example, against a vehicle structural part or the panel 80. As a result of the arched curvature, the lateral air-guiding elements 15 and 25 extend laterally outward by a distance ds, as is apparent from FIG. 10; the overall cross-section of the vehicle 1 is therefore slightly enlarged.

Figure 6:
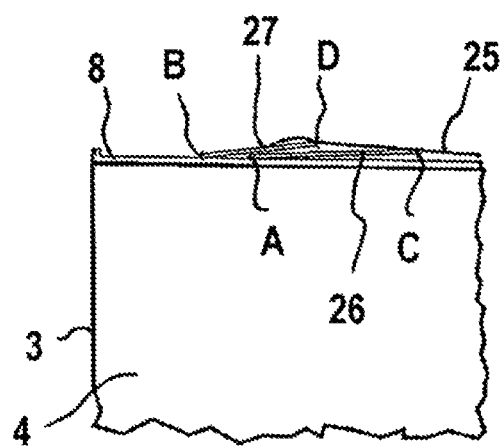
FIG. 6 shows a top view of the home position of the right lateral guiding surface.
Figure 7:
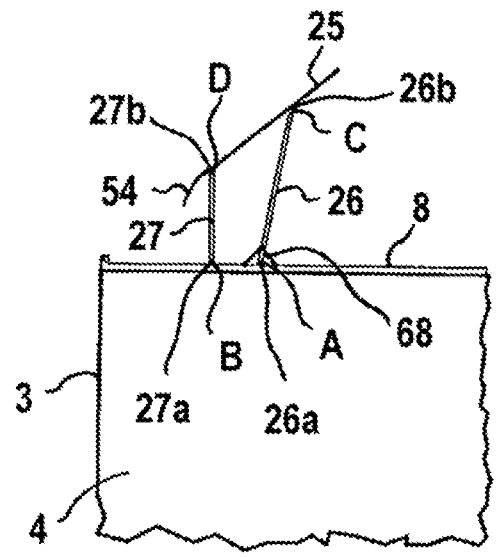
FIG. 7 shows a top view of the first intermediate position of the right lateral guiding surface corresponding to FIG. 2.
Figure 8:
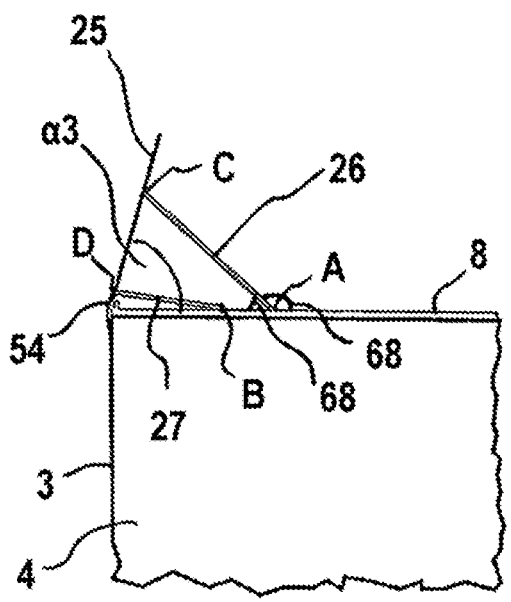
FIG. 8 shows a top view of the travel position of the right lateral guiding surface.

FIGS. 6 and 7 show a top view of the swivel-open process; the four-joint couplings 18 and 28 provide for a suitable swivel motion such that the guide-surface extensions 54 do not impact the rear doors 6, 8 or the vehicle structure 2 in the final phase and, in the travel position, the press effect or the application of force for pressing the sealing element 61 is achieved.

The end regions 54 are therefore pressed laterally from the outside toward the inside against the side walls 3, wherein, as a result of the sealing element 61, a sealing of an intermediate space 82 formed between the side wall 3 and the air-guiding element 25 is achieved. Therefore, irregularities present in the intermediate space 82, such as the receptacle 81 for the panels or even a gap 81a next to or the receptacle, are accommodated and cannot contribute to the formation of turbulence.

Therefore, according to FIG. 10, a region 84 is formed that is shielded from the wind of the vehicle's own speed, which region is shown here using dashed lines for the purpose of illustration; the region 84 extends from the intermediate space 82 advantageously into the rear region of the vehicle 1.

All the guide elements 15, 25, 35, 45 can be made from plastic, at a reasonable cost. The rocker arms 16, 17, 26, 27, 36, 37, 46, 47 can be formed from any material, e.g., from metal in order to provide high stability.

The sealing element 61 is advantageously made from a flexible material, in particular also being produced with greater adhesive strength than the air-guiding elements. The material can be a rubber material or a plastics material, e.g., a polyurethane foam (PUR foam). In addition, it can also be formed as a fiber-reinforced rubber or plastics material.

The sealing element or sealing lips can be attached as separate parts at the front ends 54 of the lateral air-guiding elements 15. In addition, an integrated or one-part embodiment with the lateral air-guiding elements 15 is also possible, e.g., a one-part, thin-walled embodiment.

The four-joint couplings 18 and 28 and their displacements are described in greater detail in the following.

The main rocker arm 16 is hinged to the left rear door 6 with one end in a front joint in a joint axis A, and is hinged to the left lateral air-guiding element 15 with its other end via a rear joint 16b in a joint axis C. Instead of a main rocker arm 16, it is also possible to provide two main rocker arms 16 vertically one above the other, i.e., having aligned front joints 16a and aligned rear joints 16b; the relevant point is that a front joint axis A and a rear joint axis C, respectively, are formed.

The at least one secondary rocker arm 17 is hinged to the left rear door 6 in a front joint 17a in a front joint axis B and is hinged to the lateral air-guiding element 15 in a rear joint 17b in a rear joint axis D. In the embodiment shown, two secondary rocker arms 17 are provided, vertically one above the other, having aligned joints 17a in the common front joint axis B and aligned joints 17b in a common rear joint axis D; in principle, it is also possible for only a single secondary rocker arm to be provided. The longitudinal extension of the secondary rocker arm 17 is therefore determined by the separation of its joints 17a and 17b, i.e., of the joint axes B and D, and is labeled as L2. In this case, L1>L2, i.e., the main rocker arm 16 is longer than the at least one secondary rocker arm 17.

The right lateral spoiler device 10 has a corresponding design: the main rocker arm 26 has a first length L1 and is connected in a first joint 26a and a rear joint 26b; the two secondary rocker arms 27, which are disposed one above the other, are hingedly mounted in a front joint 27a and a rear joint 27b in each case, wherein the front joints 27a and, therefore, the rear joints 27b of the two secondary rocker arms 27 are aligned in each case.

In addition, the two joint axes A and B are offset with respect to one another in the transverse direction or Y-direction on the left rear door 6; therefore, the rear joint axes C and D on the lateral air-guiding element 15 are also offset with respect to one another in the transverse direction or Y-direction. Advantageously, the joint axes B and D of the secondary rocker arm 17 are provided further outward in the Y-direction or transverse direction, i.e., toward the left side wall 3, than the joint axes A and C of the main rocker arm 16. The rocker arms 16, 17, with their joints 16a, 16b, 17a, 17b or the joint axes A, B, C, D therefore form a four-link mechanism or the four-joint coupling 18 between the left rear door 6 and the left lateral air-guiding element 15, which thereby ensures a forced guidance between the home position shown in FIG. 1 and the travel position shown, e.g., in FIGS. 5 and 10. This is also evident, in particular, from the top views from FIGS. 6 to 9 in case of the right lateral spoiler device 10, in which the same joint axis designations A, B, C, D are used. With respect to the specific joint embodiments:

In the home position from FIG. 1, the lateral air-guiding element 15 is situated substantially parallel to the left rear door 6, wherein the two rocker arms 16 and 17 likewise extend substantially parallel and are therefore accommodated is a flat position between the rear door 6 and the lateral air-guiding element 15. In order to ensure an unobstructed folding motion, the two secondary rocker arms 17 are therefore also slightly offset in the vertical direction or Z-direction with respect to the main rocker arm 16, in particular as shown, by way of a secondary rocker arm 17 being provided above and the other secondary rocker arm 17 being provided below the main rocker arm 16, and therefore all the folding and swiveling motions can be carried out without interfering with the main rocker arm 16 and the two secondary rocker arms 17.

In the home position from FIG. 1, the two left rocker arms 16 and 17 are therefore swiveled inward in such a way that their rear joints 16b and 17b are swiveled toward the center, i.e., away from the left side wall 3, and so the front joint 16a is disposed further outward than the rear joint 16b and, therefore, the front joint 16a is disposed further outward in the transverse direction or Y-direction than the rear joint 17b. In this home position, the left lateral air-guiding element 15 lies in a flat position on the rocker arms 16, 17 and, therefore, substantially parallel to the closed left rear door 6.

Figure 2:
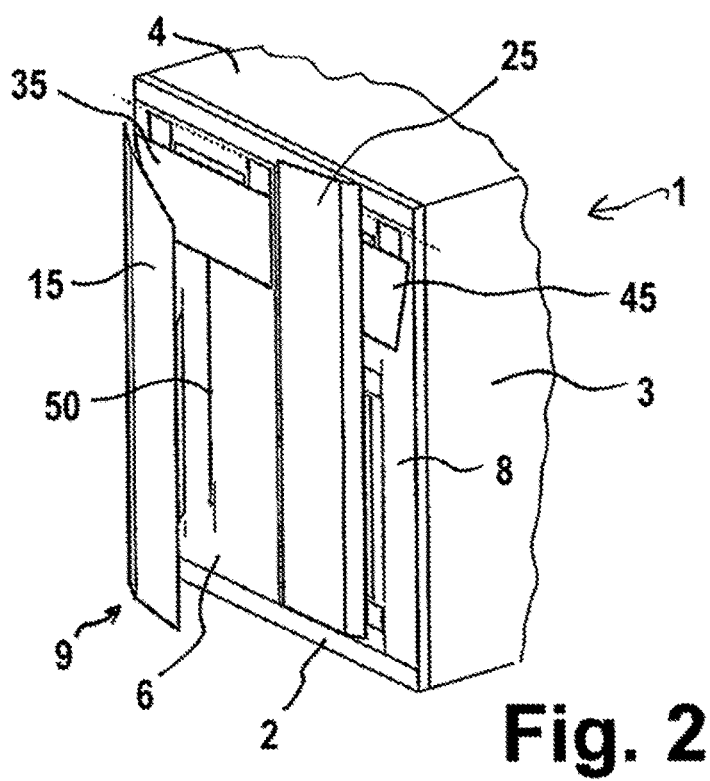
FIG. 2 shows a first intermediate step for deploying the left lateral guiding surface.
Figure 3:
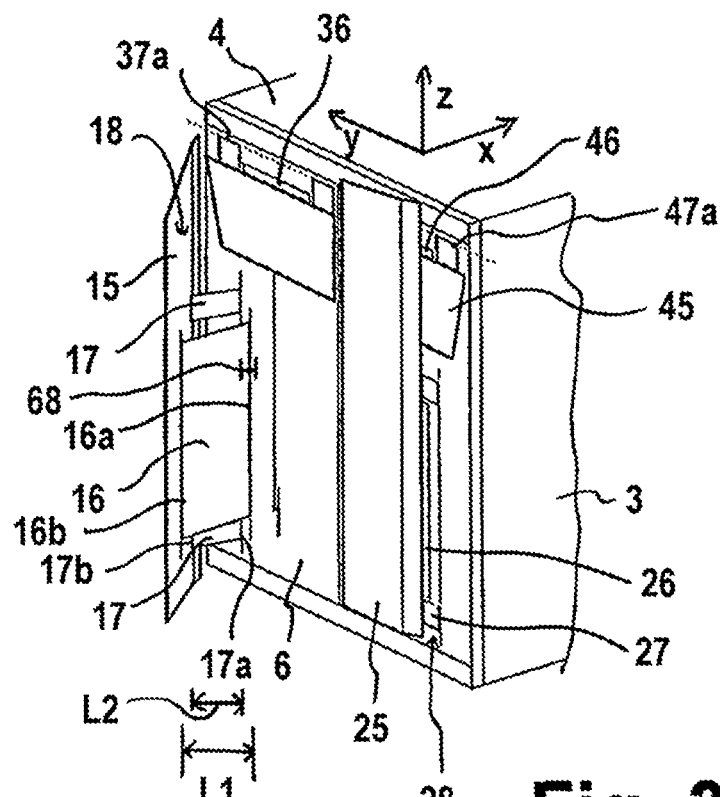
FIG. 3 shows a second intermediate step, which follows FIG. 2, of the deployment motion of the left lateral guiding surface.
Figure 4:
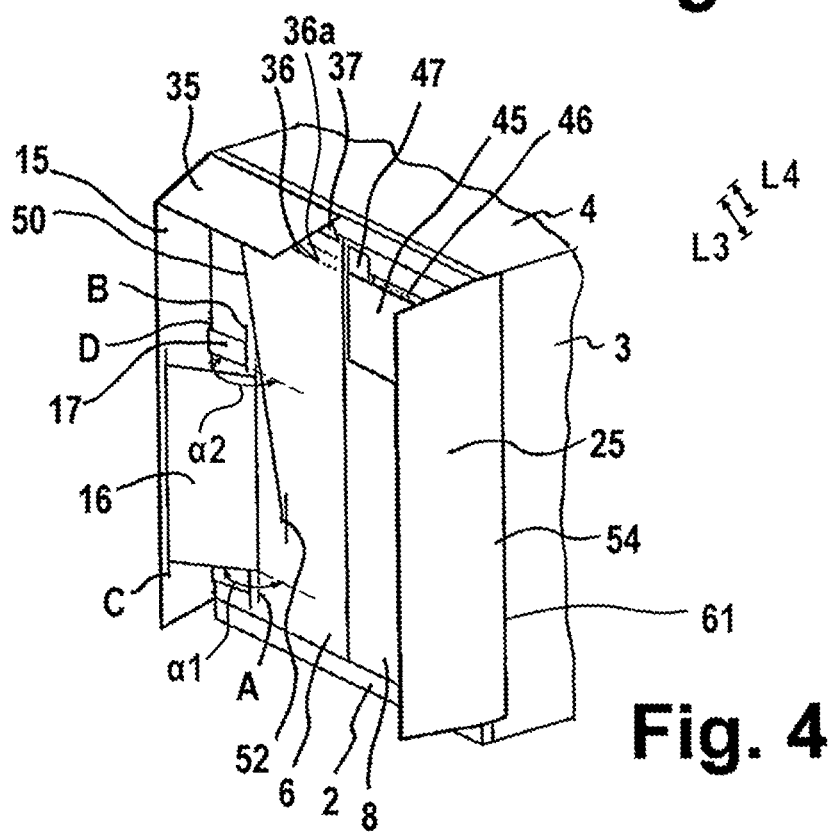
FIG. 4 shows the rear region of the vehicle having fully deployed lateral guiding surfaces and deployed roof guiding surface.

Advantageously, a bistable spring device 68 is provided, which presses the four-joint coupling 18 either into the home position or into the travel position, e.g., having a dead-center position in the position shown from FIG. 2 or 3.

The home position can be additionally locked, e.g., by means of the locking mechanism 71 illustrated in FIG. 1, which can be mounted, e.g., as a swivelable bracket, on the rear door 6, e.g., with the bearing block of the front joint 17a, in order to lock a secondary rocker arm 17, which is lying in a flat position.

Proceeding from FIG. 1, for the displacement into the travel position, the left lateral air-guiding element 15 is swiveled toward the rear, wherein FIGS. 2 and 3 show intermediate positions (without any particular function) merely by way of example: In the first intermediate position according to FIG. 2, the left lateral air-guiding element 15 therefore moves toward the rear, away from the rear door 6, wherein, due to the shorter second length L2 of the secondary rocker arm 17 hingedly connected further outward (outward in the Y-direction), a front end 15a of the left lateral air-guiding element 15 executes a small swivel motion or a swivel motion having a smaller radius than does the rear end 15b. Via the second intermediate position from FIG. 3, the lateral air-guiding element 15 therefore reaches the fully deployed or folded-out travel position, in which, advantageously, the two secondary rocker arms 17 therefore rest in a flat position on the left rear door 6; the secondary rocker arms 17 therefore advantageously execute a swivel motion having a swivel angle $\alpha 2=180°$. The main rocker arm 16, however, executes a smaller swivel motion having a swivel angle $\alpha 1 < \alpha 2$, e.g., $\alpha 1$ between 90° and 180°, and so the rear end 15b of the left lateral air-guiding element 15 is not oriented exactly in the longitudinal direction or X-direction, but rather is situated slightly toward the lateral center or in the Y-direction toward the center.

The spring devices 68, e.g., gas springs 68—which are shown in only a few drawings, for the sake of clarity—can be formed, e.g., in the case of the left lateral spoiler device 9, for example, between the rear door 6 and the lateral air-guiding element 15 or preferably incorporating the rocker arms 16 and 17; in the case of the left lateral spoiler device 9, for example, a spring device 68 can be provided between the main rocker arm 16 and its front joint 16a or the bearing block of the front joint 16a, which is supposed to be fastened on the door side, in a corresponding manner also for the other spoiler devices 10, 11, 12.

Proceeding from FIG. 1, the spring device 68 initially acts counter to the displacement motion and supports the user in the final phase of the displacement such that only the home position and the travel position can be set, but intermediate positions cannot.

As a result of the spring device 68, the press effect or pressure force can therefore also be applied for pressing the sealing element 61 against the side wall 3.

The left roof spoiler device 11 is therefore also hinged to the left rear door 6 via a four-joint coupling 38, by means of a main rocker arm 36 having a third length L3 and at least one secondary rocker arm 37 having a fourth length L4, wherein L3>L4. In the embodiment shown, the four-joint coupling 38 is also implemented using a main rocker arm 36 and two parallel secondary rocker arms 37, which are hingedly mounted so as to be aligned, and so a four-joint coupling 38 is formed again, corresponding to the four-joint couplings 18 and 28 of the lateral spoiler devices 9 and 10, therefore resulting in a forced guidance of the left roof air-guiding element 35 from the home position shown in FIG. 1 into the travel position shown in FIGS. 4, 5. The arrangement of the front joints 36a and 37a of the main rocker arm 36 and the secondary rocker arm 37 and the lengths L3 and L4 can be selected in such a way that a desired deployment angle of the left roof air-guiding element 35 is achieved.

Correspondingly, the right roof spoiler device 12 is formed so as to comprise a right roof air-guiding element 46, a right roof main rocker arm 46 and two right roof secondary rocker arms 47, having the same geometric configuration as the left roof spoiler device 11, i.e., having the same lengths L3 and L4, wherein, in this case, the front joints are advantageously aligned, and, therefore, also in the travel position, the rear joints are advantageously aligned.

The left lateral spoiler device 9 is locked in the travel position either via a locking bar that can be folded over or via another locking mechanism 69, such as, e.g., the locking mechanism 71 of the secondary rocker arm 17, since this rests in a flat position against the rear door 6 in the travel position and, therefore, the locking mechanism 69 can be attached on the rear door 6 as a bracket, e.g., as a further component or together with the front joint 17a of the secondary rocker arm 17; this is also possible in a corresponding manner with respect to the right lateral spoiler device 10. The locking mechanism 71 for the travel position can also be mounted together with the front joint 17a or its bearing block on the rear door 6, and so simple installation is possible.

In addition, a locking of the left lateral spoiler device 9 is also by means of the left roof air-guiding element 35 in its extended position such that this rests, e.g., with its right edge 35c, against the inner side or the upper edge of the left lateral air-guiding element 15, and therefore blocks its swivel-in motion.

The left roof spoiler device 11, in turn, is advantageously locked by means of additional mechanical locking mechanisms, e.g., an actuating rod 50, which is initially used for raising the left roof air-guiding element 35 and is subsequently fixed on the rear door 6 in a locking device 52, advantageously at a suitable angle with respect to the left rear door 6, in order to ensure a stable triangular configuration.

Therefore, on each rear door 6, 8, the particular lateral spoiler device 9 or 10, respectively, is initially displaced out of the home position into the travel position, which displacement can be manually carried out by the user, e.g., the driver, by swiveling the left lateral air-guiding element 15 or the right lateral air-guiding element 25 backward, since this is forcibly guided by the particular four-joint coupling 18 or 28, respectively, and can therefore be easily swiveled into the particular travel position, advantageously supported by the spring device in the final phase of the swivel motion. The locking can then be carried out by folding over the locking mechanism 69.

Next, the user grips the actuating rod 50 and folds the particular roof air-guiding element 35 or 45 upward into its folded-out travel position, in which it locks the lateral air-guiding 15 or 25, respectively, in its travel position and locks the forcing lever 50 or 60 into a locking mechanism 52 or 62, respectively. The roof spoiler devices 11 and 12 can also be spring-loaded by means of spring devices; an embodiment without a spring effect is also possible in this case, however, in order to not increase the difficulty of the initial displacement counter to the weight, wherein the travel position is nonetheless fixed by means of the locking mechanism.

Figure 9:
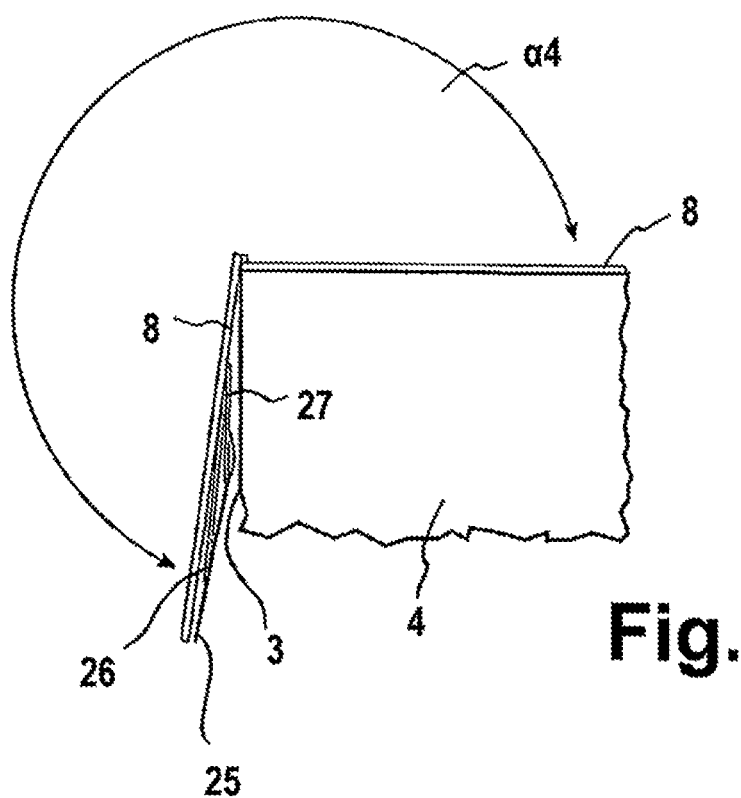
FIG. 9 shows a top view of the right rear region of the vehicle, in the home position having the rear door folded forward.
Figure 10:
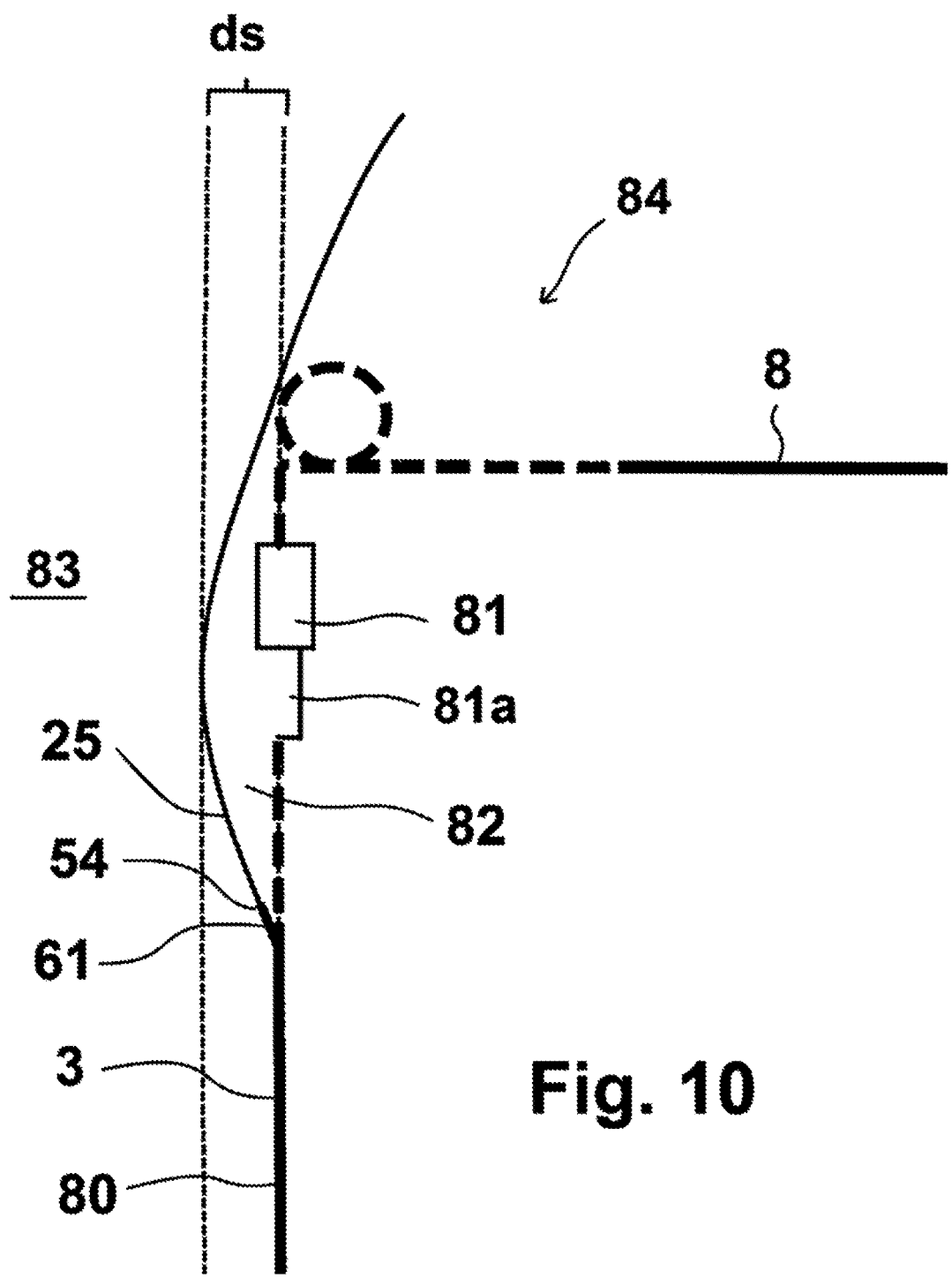
FIG. 10 shows an enlarged depiction of the region of the air-guiding element.

Proceeding from the home position from FIG. 1, both rear doors 6 and 8 can be swiveled fully open and forward, as is apparent from the top view from FIG. 9. A typical opening having an opening angle α4 of 270° or almost 270° is therefore possible. The entire rear spoiler device 14 or, according to FIG. 9, the right lateral spoiler device 10 and the right roof spoiler device 12, are folded in, in this case, and therefore lie in a flat position, and so they can be accommodated between the swiveling-open rear door 8 and the side wall 3 without adversely affecting the swivel-open process or the opening angle to a substantial extent.

While the above description constitutes the preferred embodiments of the present invention, it will be appreciated that the invention is susceptible to modification, variation and change without departing from the proper scope and fair meaning of the accompanying claims.

The invention claimed is:

1. A rear spoiler device (14) for a vehicle (1), wherein the rear spoiler device (14) at least comprises:
    an air-guiding element (15, 25, 35, 45) for lengthening a contour of an outer surface (3, 4) of the vehicle (1) in a travel position, a displacement device (18, 28, 38, 48) for displacing the air-guiding element (15, 25, 35, 45) between the travel position and a home position,
    wherein a front end (54) of the air-guiding element (15, 25, 35, 45) is arranged so as to bear against the outer surface (3, 4) of the vehicle (1) in the travel position, wherein at least one sealing element (61) for sealingly bearing against the outer surface (3, 4) of the vehicle is arranged at the front end (54) of the air-guiding element (15, 25, 35, 45), and
    the displacement device (18, 28, 38, 48) is configured for pressing the sealing element (61) against the outer surface (3, 4) in the travel position wherein the displacement device (18, 28, 38, 48) is designed as a forced guidance device having only one degree of freedom for displacing the air-guiding element (15, 25, 35, 45) between the home position and the travel position and is a four-link mechanism having four joints or joint axes (A, B, C, D), at least one main rocker arm (16, 26, 36, 46) having a longer length (L1, L3) and at least one secondary rocker arm (17, 27, 37, 47) having a shorter length (L2, L4) than the main rocker arm (16, 26, 36, 46), wherein the main rocker arm (16, 26, 36, 46) and the secondary rocker arm (17, 27, 37, 47) each have a front joint (16a, 17a, 26a, 27a, 36a, 37a) for connection to a rear door (6, 8) of the vehicle (1).

2. The rear spoiler device (14) as claimed in claim 1, wherein the front end (54) of the air-guiding element (15, 25, 35, 45) is curved toward the outer surface (3, 4).

3. The rear spoiler device (14) as claimed in claim 1, wherein the sealing element (61) is attached as a separate component on the air-guiding element (15, 25, 35, 45).

4. The rear spoiler device (14) as claimed in claim 3, wherein the sealing element (61) is made from a more flexible material than the air-guiding element (15, 25, 35, 45).

5. The rear spoiler device (14) as claimed in claim 1, wherein the sealing element (61) is formed as a single piece sealing lip with the air-guiding element (15, 25, 35, 45) and has a smaller width than a central region of the air-guiding element (15, 25, 35, 45).

6. The rear spoiler device (14) as claimed in claim 1, wherein the rear spoiler device is configured to be attached, in entirety, to a rear door (6) of a pair of rear doors (6, 8) of the vehicle (1) and can be accommodated between the rear door (6, 8) and the outer surface (3, 4) in the home position when the rear door (6, 8) is opened toward a vehicle front in order to bear against the outer surface (3, 4) of the vehicle (1).

7. The rear spoiler device (14) as claimed in claim 1, wherein the displacement device (18, 28, 38, 48) is designed as a forced guidance device having only one degree of freedom for displacing the air-guiding element (15, 25, 35, 45) between the home position and the travel position.

8. The rear spoiler device (14) as claimed in claim 1, wherein the front joint (17a, 27a, 37a, 47a) of the secondary rocker arm (17, 27, 37, 47) is configured to be connected to the rear door (6, 8) further outward toward the outer surface (3, 4) of the vehicle (1) than the front joint (16a, 26a, 36a, 46a) of the main rocker arm (16, 26, 36, 46).

9. The rear spoiler device (14) as claimed in claim 1, wherein the rear joint (17b, 27b, 37b, 47b) of the secondary rocker arm (17, 27, 37, 47) is connected to the air-guiding element (15, 25, 35, 45) further outward than the rear joint (16b, 26b, 36b, 46b) of the main rocker arm (16, 26, 36, 46).

10. The rear spoiler device (14) as claimed in claim 1, wherein a first swivel angle ($\alpha 1$) of the main rocker arm (16, 26, 36, 46) is smaller than a second swivel angle ($\alpha 2$) of the secondary rocker arm (17, 27, 37, 47).

11. The rear spoiler device (14) as claimed in claim 1, wherein the air-guiding element (15, 25, 35, 45), in the home position, rests in a flat position on the secondary rocker arm (17, 27, 37, 47) and the main rocker arm (16, 26, 36, 46) and substantially parallel to the rear door (6, 8) and, in the travel position, protrudes from the rear door (6, 8) at a travel-position angle ($\alpha 3$) between 0 and 90°.

12. The rear spoiler device (14) as claimed in claim 1, wherein the air-guiding element (15, 25, 35, 45), in the travel position, can be pressed against the outer surface (3, 4) of the vehicle (1) in a pressure-tight manner or so as to seal a pressure difference, for shielding an intermediate region (82) between the air-guiding element (15, 25, 35, 45) and the outer surface (3, 4) with respect to an outer space (83) through which an airstream can flow.

13. The rear spoiler device (14) as claimed in claim 1, wherein the air-guiding element (15, 25), in the travel position, extends from its front end region (54) toward the rear initially laterally outward in an arch shape and subsequently extends laterally inward to behind a rear region or a rear door (8) of the vehicle (1).

14. A vehicle (1) comprising a rear spoiler device (14) as claimed in claim 1, wherein, in the travel position, the sealing element (61) seals an intermediate space (82) between the air-guiding element (15, 25) and the outer surface (3, 4) with respect to an outer space (83) of the vehicle (1), through which an airstream can flow.

15. The vehicle (1) as claimed in claim 14, wherein the displacement device (18, 28, 38, 48), in the travel position, presses the sealing element (61), which is arranged at the front end region (54) of the air-guiding element (15, 25), against the outer surface (3, 4) of the vehicle against a panel (80).

16. The vehicle (1) as claimed in claim 14, wherein, during the displacement into the travel position, the displacement device (18, 28, 38, 48) swivels the air-guiding element (15, 25) with the front end region (54) against the outer surface (3, 4).

17. The vehicle as claimed in claim 14, wherein irregularities or structures (81) are formed on a lateral surface (3) in the intermediate space (82) separated from the air-guiding element (15, 25).

18. The rear spoiler device (14) as claimed in claim 1, wherein the sealing element (61) is made from a rubber material or a plastic material.

19. The rear spoiler device as claimed in claim 18, wherein the rubber material or plastic material is reinforced with fibers.

* * * * *